United States Patent [19]

Lightcap, Jr.

[11] Patent Number: 5,647,899
[45] Date of Patent: Jul. 15, 1997

[54] SEALING COMPOSITION FOR CONCRETE

[75] Inventor: Donald Victor Lightcap, Jr., Woodburn, Ind.

[73] Assignee: Midwest Biologicals, Inc., Woodburn, Ind.

[21] Appl. No.: 560,438

[22] Filed: Nov. 17, 1995

[51] Int. Cl.⁶ ............................................. C09D 191/00
[52] U.S. Cl. ....................................................... 106/244
[58] Field of Search ............................................ 106/244

[56] References Cited

U.S. PATENT DOCUMENTS

| | | | |
|---|---|---|---|
| 2,916,402 | 12/1959 | Baird et al. | 106/244 |
| 3,502,500 | 3/1970 | Hoock | 117/123 |
| 3,573,942 | 4/1971 | Wassenberg et al. | 106/227 |
| 4,207,115 | 6/1980 | Boehme et al. | 106/95 |
| 4,225,651 | 9/1980 | Hutton et al. | 428/443 |
| 4,239,540 | 12/1980 | Hsip-Chu | 106/12 |
| 4,402,753 | 9/1983 | Amara et al. | 106/94 |
| 4,575,468 | 3/1986 | Sakuta | 427/393.6 |
| 5,346,544 | 9/1994 | Shibata et al. | 106/244 |
| 5,360,847 | 11/1994 | Dewacker et al. | 524/56 |
| 5,494,502 | 2/1996 | DeLong | 106/244 |

FOREIGN PATENT DOCUMENTS

| | | | |
|---|---|---|---|
| 0607053 | 7/1994 | European Pat. Off. | 106/244 |

OTHER PUBLICATIONS

Edward E. Perkins, *Practical Handbook of Soybean Processing and Utilization*, edited by David R. Erickson, AOCS Press, Champaign, IL & United Soybean Board, St. Louis, MI (1995) no month available pp. 11,18–19.

*Primary Examiner*—David Brunsman
*Attorney, Agent, or Firm*—Mark F. Smith; Smith, Brandenburg, Hartman, Freese & Knochelmann PLC

[57] ABSTRACT

An improved sealing composition for concrete which is effective for sealing a concrete surface to prevent the passage of water therethrough comprising a non-refined vegetable oil such as coconut oil, corn oil, cottonseed oil, palm oil, rapeseed (canola) oil, soya oil, sunflower oil, and mixtures thereof; an emulsifier effective for providing a oil-in-water emulsion, and water. A preferred composition comprises a pre-emulsion concentrate comprising essentially of about 95% to about 50% by weight of a non-refined vegetable oil, about 5% to about 50% of an emulsifier comprising a 3 mole ethylene oxide adduct of C12 and C14 alcohols; and water.

8 Claims, No Drawings

SEALING COMPOSITION FOR CONCRETE

BACKGROUND OF THE INVENTION

This invention relates to a sealing composition for concrete and more particularly, to a water dispersible sealing composition for protecting concrete against spalling, cracking or other deterioration caused by the penetration of water through exposed concrete surfaces.

Concrete used in the concrete industry for constructing and repairing pavements, highways, buildings, and the like are typically coated with a sealing composition to prevent or inhibit the penetration of water through exposed surfaces in order to inhibit or prevent the water from damaging the concrete. Water penetration is of particular concern in areas where temperatures may fluctuate between freezing and thawing. Stress caused by the expansion and contraction of the water often results in low-cycle fatigue fractures in the concrete.

Equally well known in the concrete industry is the need for good curing of concrete to ensure maximizing strength characteristics. Sufficient water must be present in the concrete mix to hydrate the silicate and aluminate compounds which make up the cement. Either a deficiency or an excess of water in the mix during the curing process will result in the concrete not achieving its necessary or desired strength.

Further, such a deficiency or an excess of water may result in shrinkage thereby causing cracks to form. Therefore, formulations for making concrete normally includes only the water required for hydration. Accordingly, the rate of water loss during the curing process should be kept at a minimum. During the initial stages of curing, water evaporates at the exposed surfaces of the concrete. To prevent rapid drying, which may result in shrinkage and cracking of the concrete, sealing compositions are often used to coat freshly laid concrete to inhibit or prevent such evaporation.

One concrete sealing composition typically used in the concrete industry to inhibit or prevent water penetration through exposed concrete surfaces comprises a high concentration of refined oil such as petroleum oil. The use of petroleum based oils, however, may cause surface discoloration. Another concrete sealing composition typically used in the concrete industry comprises a high concentration of linseed oil. The use of a linseed oil, however, also results in surface discoloration. In addition, such concrete sealing compositions often use petroleum based solvents or carriers to reduce viscosity for application. Since spraying is a common method of applying water sealing compositions for concrete, sealing compositions containing petroleum based oils, solvents or carriers have been criticized since prolonged breathing of the spray mist can result in health problems. The use of such sealing compositions has also been criticized because of their general high degree of flammability and the potential for environmental problems caused by spillage, run off and over spray.

Sealing compositions have been developed which use refined vegetable oils and silicone oil dispersants. Such sealing compositions are relatively easy to apply and do not have many of the concerns associated with petroleum based oil compositions. However, they generally deteriorate quickly and, depending on the weather conditions, must be reapplied every five or six months.

Other sealing compositions typically used in the concrete industry for inhibiting or preventing the penetration of water through exposed concrete surfaces contain a chlorinated rubber or a chlorinated resin. Such sealing compositions, however, are susceptible to ultraviolet destruction and rubber marking caused by automobile and truck tires.

Consequently, a need exists for a sealing composition for concrete which is effective for preventing or inhibiting the penetration of water through exposed surfaces in order to protect against spalling, cracking or other deterioration caused by such penetration of water and which is non-toxic, non-staining, stable, ecologically acceptable, relatively inexpensive and easily applied.

SUMMARY OF THE INVENTION

The present invention is directed to an improved sealing composition for concrete which is effective for sealing a concrete surface to prevent the passage of water in either direction therethrough. In a preferred embodiment of the invention, the sealing composition comprises a non-refined vegetable oil, an emulsifier effective for providing a stable concentrate and oil-in-water emulsion, and water.

In another preferred embodiment of the invention, the vegetable oil comprises a non-refined soya oil.

In another preferred embodiment of the invention, the emulsifier comprises an alkyl alcohol ethoxylate.

In another preferred embodiment of the invention, the sealing composition for concrete is formed from a pre-emulsion concentrate which is stable and does not separate during storage;

A primary object of this invention, therefore, is to provide a sealing composition for concrete which is effective for sealing a concrete surface to reduce or eliminate water damage;

Another primary object of this invention is to provide a sealing composition for concrete which is effective for inhibiting or preventing water evaporation during curing;

Another primary object of this invention is to provide a sealing composition for concrete which does not result in discoloration of the concrete surface;

Another primary object of this invention is to provide a sealing composition for concrete which is stable and does not separate during storage;

Another primary object of this invention is to provide a sealing composition for concrete which is formed from a pre-emulsion concentrate which is stable and does not separate during storage;

Another primary object of this invention is to provide a sealing composition for concrete which is non-toxic;

Another primary object of this invention is to provide a sealing composition for concrete which is ecologically acceptable;

Another primary object of this invention is to provide a sealing composition for concrete which is relatively inexpensive; and Another primary object of this invention is to provide a sealing composition for concrete which is easy to apply.

These and other objects and advantages of the invention will be apparent from the following description and the appended claims.

DESCRIPTION OF THE PREFERRED EMBODIMENT

The sealing composition for concrete of the present invention comprises an oil and water emulsion prepared from a pre-emulsion concentrate having a high concentration of a non-refined, vegetable oil. Preferably, the oil comprises soya oil, however, other non-refined suitable vegetable oils include coconut oil, corn oil, cottonseed oil, palm oil, rapeseed (canola) oil, and sunflower oil. The term "non-refined" or "crude" soybean oil as used herein and in the vegetable oil industry refers to oil pressed from soybean flakes by mechanical means or extracted from soybean flakes with mixed hexanes. The solvent is removed to produce the initial crude oil. The term "refined" soybean oil as used herein and in the vegetable oil industry refers to pure soybean oil in which all of the fatty acids and other nonoil material has been removed by chemical means and physical or mechanical separation. Typical composition for non-refined and refined soybean oil is shown in Table I. It should be apparent to one skilled in the art that a sealing composition for concrete comprising a non-refined vegetable oil as a base component will be significantly less expensive than conventional sealing compositions for concrete which require refined petroleum or vegetable oils as a base component.

TABLE I

|  | Non-refined | Refined |
| --- | --- | --- |
| Triglycerides | 95–97 | >99 |
| Phosphatides | 1.5–2.5 | 0.003–0.005 |
| Unsaponifiable matter | 1.6 | 0.3 |
| Plant sterols | 0.33 | 0.13 |
| Tocopherols | 0.15–0.21 | 0.11–0.18 |
| Hydrocarbons (Squalene) | 0.014 | 0.01 |
| Free fatty acids | 0.3–0.7 | <0.05 |
| Trace metals |  |  |
| Iron, ppm | 1–3 | 0.1–0.3 |
| Copper, ppm | 0.03–0.05 | 0.02–0.06 |

The pre-emulsion concentrate is prepared by using an emulsifier which is suitable for providing a stable oil and emulsifier composition having a large percentage of non-refined vegetable oil. Such non-refined vegetable oils has not been used in the concrete industry for sealing compositions due to the difficulty and expense of preparing the stable pre-emulsion concentrate necessary for the coating composition. However, it has been found that alkyl, aryl or glycol ethoxylate, propoxylate, butoxylate or sulfonate based emulsifiers may be used in the present invention to facilitate the formation of the non-refined vegetable oil pre-emulsion concentrate.

The sealing compositions of the present invention are prepared by mixing about 70% to about 95% by weight of a non-refined vegetable oil with about 5% to about 30% by weight of an emulsifier to form a stable pre-emulsion concentrate. The pre-emulsion concentrate may be stored until ready to use or shipped to the ultimate customer for use. The pre-emulsion concentrate is mixed with water to form the sealing composition having the desired viscosity. The viscosity should be low enough to ensure that the composition can be easily dispensed by using conventional brush, roll or spray systems and to allow penetration of the composition into the pores of the concrete.

An emulsifier, which has been found to be particularly effective for producing a stable pre-emulsion concentrate which will not separate during conditions of long term storage comprises a 3 mole ethylene oxide adduct of C12 and C14 alcohols. In formulating the emulsifier, about 30% to about 50% by weight of C12 alcohol is first mixed with about 50% to about 70% C14 alcohol. The C12 and C14 alcohols are then ethoxylated with 3 moles of ethylene oxide to produce the desired emulsifier.

In a preferred embodiment of the present invention, the pre-emulsion concentrate comprises about 88% of a non-refined soya oil and about 11% by weight of an emulsifier comprising a 3 mole ethylene oxide adduct of C12 and C14 alcohols. The oil and emulsifier are intimately blended together at about 70 to about 100 degrees Fahrenheit o form the pre-emulsion concentrate. To produce the desired sealing composition for concrete, the pre-emulsion concentrate is added to water such that the ratio by volume of water to the pre-emulsion concentrate is about 2 to 1.

When applied to a porous concrete surface, the sealing composition penetrates into the concrete, carrying the vegetable oil into the pores. As the water slowly evaporates, the oil remains and fills the pores forming a water resistant layer which inhibits or prevents the penetration of water through the exposed concrete surface thereby inhibiting or preventing water from damaging the concrete. When the sealing composition is applied onto fresh concrete, the resulting water resistant layer will reduce the drying rate and consequently will increase its strength and minimize the occurrence of cracks.

In order to further illustrate the invention, the following specific examples of sealing compositions for concrete were prepared:

EXAMPLE I

A sealing composition for concrete was prepared comprising essentially of a non-refined soya oil.

EXAMPLE II

A sealing composition for concrete was prepared by mixing together a non-refined soya oil with an emulsifier comprising a 3 mole ethylene oxide adduct of C12 and C14 alcohols to produce the desired composition. The final proportions were 89% by weight of soya oil and 11% by weight of emulsifier.

EXAMPLE III

A sealing composition for concrete was prepared in accordance with the present invention by mixing a non-refined soya oil with an emulsifier comprising a 3 mole ethylene oxide adduct of C12 and C14 alcohols to form a pre-emulsion concentrate. The final proportions were 89% by weight of soya oil and 11% by weight of emulsifier. The pre-emulsion concentrate was added to water to produce the desired composition having the ratio by volume of water to pre-emulsion concentrate of 1 to 1.

EXAMPLE IV

A sealing composition for concrete was prepared in accordance with the present invention by mixing a non-refined soya oil with an emulsifier comprising a 3 mole ethylene oxide adduct of C12 and C14 alcohols to form a pre-emulsion concentrate. The final proportions were 89% by weight of soya oil and 11% by weight of emulsifier to form a pre-emulsion concentrate. Water was added to the pre-emulsion concentrate to produce the desired composition having the ratio by volume of water to pre-emulsion concentrate of 2 to 1.

The example compositions were each applied to a fresh concrete surface using conventional rolling equipment and were tested in comparison with the concrete sealing composition of the present invention having the preferred water to oil ratio (EXAMPLE IV).

The results were as follows:

EXAMPLE I—It was observed that the composition was effective for sealing against water penetration. However, severe surface discoloration was observed.

EXAMPLE II—It was observed that the composition was effective for sealing against water penetration. However, substantial Surface discoloration was observed.

EXAMPLE III—It was observed that the composition was effective for sealing against water penetration. However, some surface discoloration was observed.

EXAMPLE IV—It was observed that the composition was effective for sealing against water penetration. No surface discoloration was observed.

The sealing composition of the present invention displayed superior characteristics to other commercially available sealing compositions for concrete. More specifically, the composition of the invention is effective for inhibiting or preventing water penetration through exposed surfaces of treated concrete and for inhibiting or preventing surface evaporation during curing. Further, the sealing composition of the present invention does not result in discoloration of the concrete surface, is stable and does not separate during storage, is non-toxic, is ecologically acceptable, relatively inexpensive and may be easily applied to the surface of pavement, highways, buildings and the like by means such as brushing, rolling or spraying.

While the composition herein described constitutes a preferred embodiment of this invention, it is to be understood that variations may be made therein without departing from the scope of the invention which is defined in the appended claims.

What is claimed is:

1. A sealing composition effective for sealing a concrete surface to inhibit or prevent the passage of water comprising a non-refined vegetable oil, an emulsifier effective for providing a stable oil-in-water emulsion, and water, wherein said emulsifier comprises alkyl alcohol ethoxylates.

2. The sealing composition of claim 1 wherein said non-refined vegetable oil is selected from the group consisting of coconut oil, corn oil, cottonseed oil, palm oil, rapeseed oil, sunflower oil, and mixtures thereof.

3. The sealing composition of claim 1 wherein said non-refined vegetable oil is a non-refined soya oil.

4. The sealing composition of claim 1 wherein said emulsifier comprises a 3 mole ethylene oxide adduct of C12 and C14 alcohols.

5. A sealing composition effective for sealing a concrete surface to inhibit or prevent the passage of water comprising about 95% to about 50% by weight of a non-refined vegetable oil, about 5% to about 50% by weight of an emulsifier effective for providing a stable oil-in-water emulsion, and water, wherein said emulsifier comprises alkyl alcohol ethoxylates.

6. A sealing composition of claim 5 wherein said emulsifier comprising a 3 mole ethylene oxide adduct of C12 and C14 alcohols.

7. A sealing composition of claim 5 wherein said non-refined vegetable oil is a non-refined soya oil.

8. A sealing composition effective for sealing a concrete surface to inhibit or prevent the passage of water comprising about 89% by weight of a non-refined soya oil, about 11% of an emulsifier comprising a 3 mole ethylene oxide adduct of C12 and C14 alcohols, and water, wherein the sealing composition has a ratio of water to soya oil and emulsifier of about 2:1 by volume.

* * * * *